United States Patent [19]

Kodadek et al.

[11] 4,453,675

[45] Jun. 12, 1984

[54] AERIAL SPRAYING APPARATUS

[75] Inventors: Robert Kodadek, York, Pa.; James H. Welch, No. Brunswick, N.J.

[73] Assignee: Herculite Products, Inc., New York, N.Y.

[21] Appl. No.: 321,023

[22] Filed: Nov. 13, 1981

[51] Int. Cl.$^3$ ............................................. A01C 19/00
[52] U.S. Cl. .................................... 239/675; 239/171; 239/687; 244/136
[58] Field of Search ............... 239/171, 656, 662, 663, 239/672, 674, 675, 684, 687; 244/136

[56] References Cited

U.S. PATENT DOCUMENTS

| | | | |
|---|---|---|---|
| 2,098,887 | 11/1937 | Satterlee | 239/171 |
| 2,924,040 | 2/1960 | White et al. | 239/663 |
| 2,986,360 | 5/1961 | Rutten | 239/656 |
| 3,463,398 | 8/1969 | Smith et al. | 239/171 |
| 3,994,437 | 11/1976 | Kitterman | 239/171 |
| 4,205,919 | 6/1980 | Attwell | 366/34 |
| 4,262,846 | 4/1981 | Funkhouser | 239/171 |

Primary Examiner—John J. Love
Assistant Examiner—Michael J. Forman
Attorney, Agent, or Firm—Sughrue, Mion, Zinn, Macpeak & Seas

[57] ABSTRACT

An aerial dispensing apparatus is detachably mounted under each wing of an aircraft for adhesively coating and dispensing flakes containing an insect control substance. The apparatus includes an aerodynamically styled liquid adhesive supply chamber secured to the forward end of a detachable support frame and a flake storage container movably supported on the rear portion of the frame for movement rearwardly of the trailing edge of the wing to facilitate filling of the container. The container is provided with a bottom opening which communicates with an electrically driven auger for metering a supply of flakes to a mixing chamber. An electrically driven pump supplies a metered amount of liquid adhesive to the mixing chamber. A propeller driven mixing blade is rotatably mounted in the mixing chamber to facilitate the coating of the individual flakes with adhesive and for impelling the flakes rearwardly through the open end of the mixing chamber. A spinner is rotatably mounted adjacent the open end of the mixing chamber to aid in dispersing the adhesively coated flakes.

5 Claims, 7 Drawing Figures

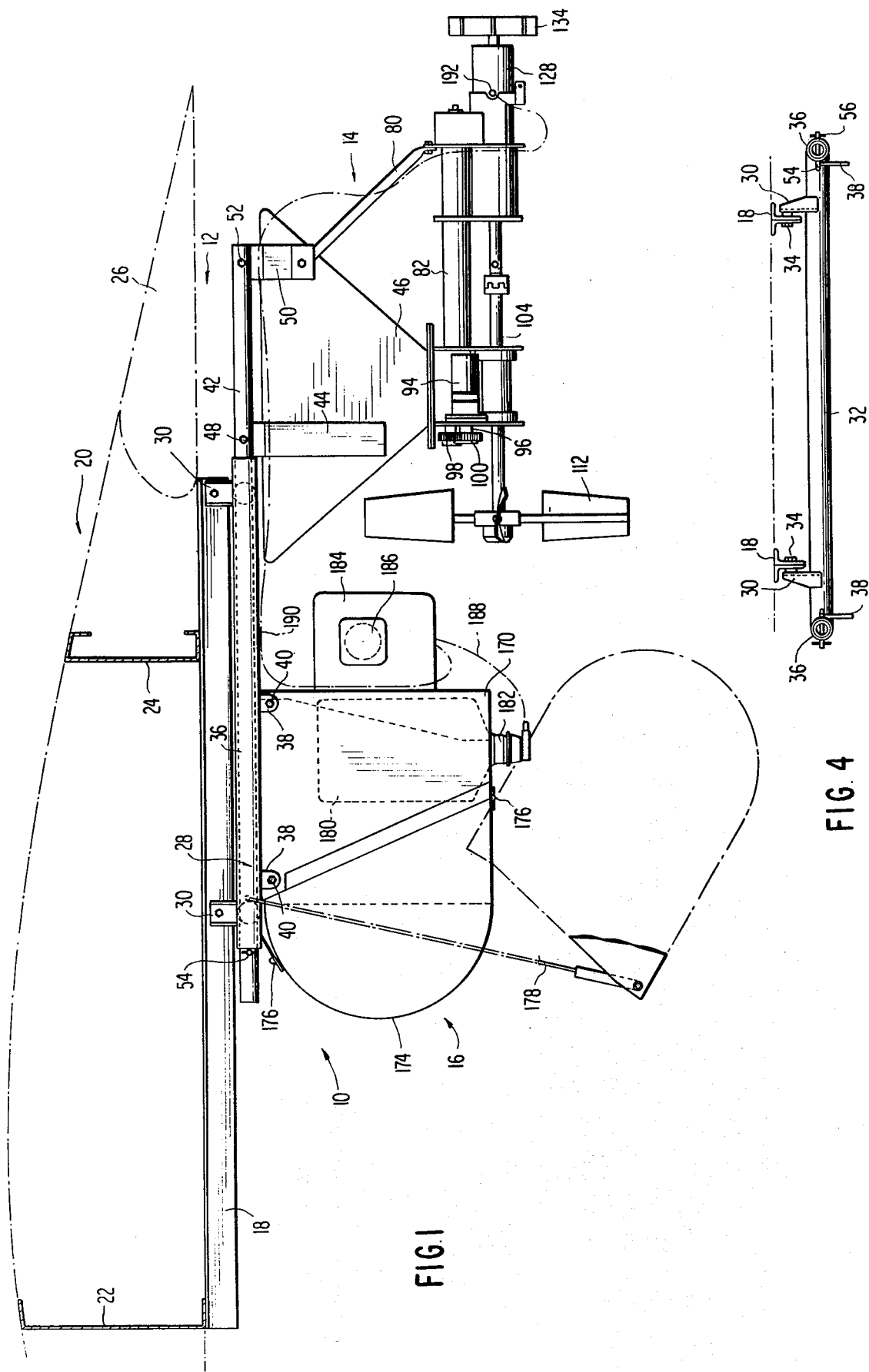

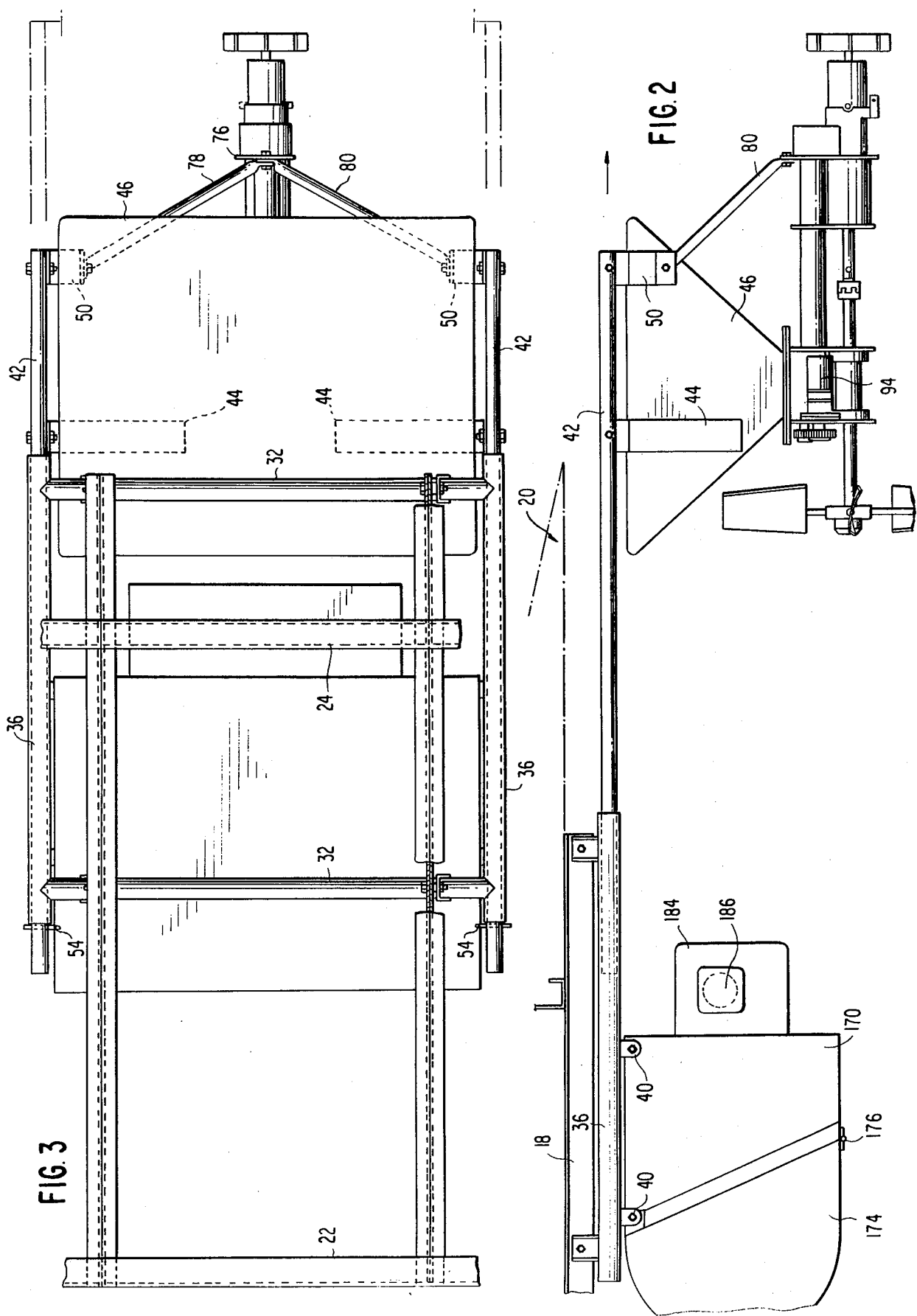

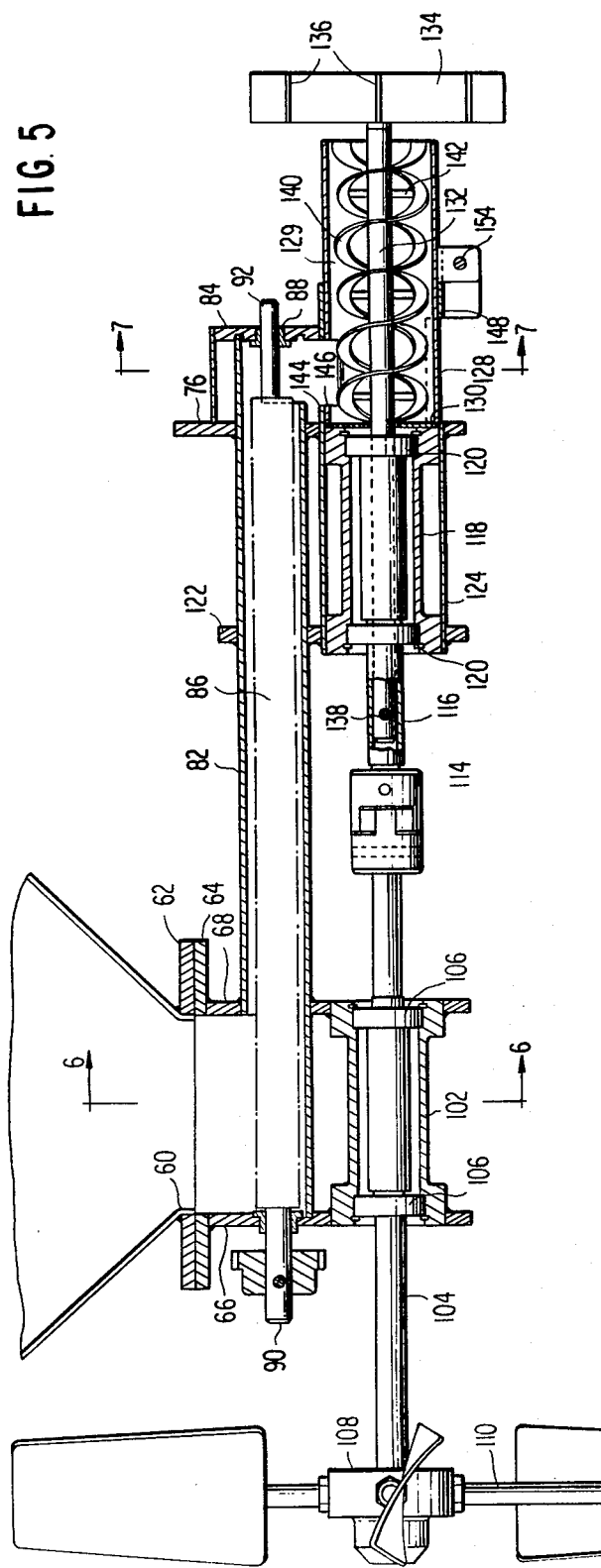
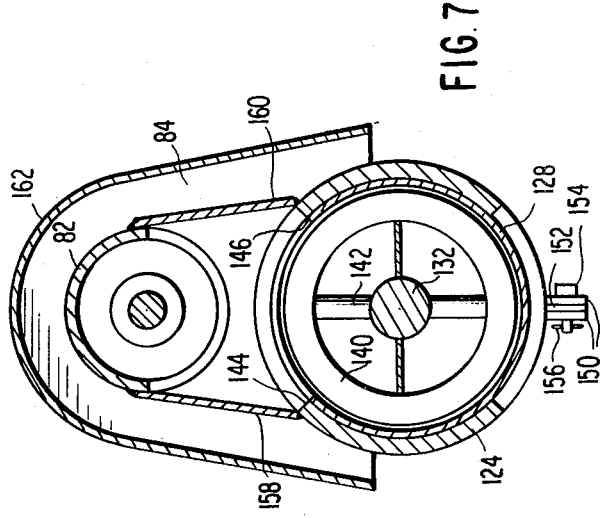
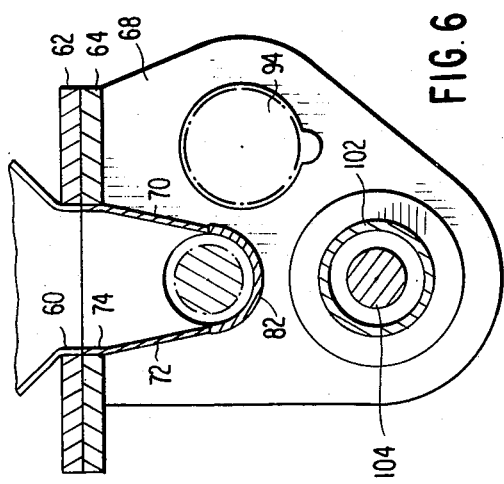

AERIAL SPRAYING APPARATUS

BACKGROUND OF THE INVENTION

The present invention is directed to an aerial applicator and more specifically to an aerial applicator for adhesively coating flakes containing an insect control substance immediately prior to dispensing the flakes from the airborne apparatus.

The use of pheromones for insect control is an emerging technology having enormus potential. As an alternative to insecticides, pheromone products can be used to suppress populations of destructive insects in both field and forest applications. Pheromones have numerous advantages over conventional insecticides. Most important, they are non-toxic and each is specific to only a particular species of insect.

Pheromones are natural chemical substances released by insects for communication purposes, including sex attractant pheromones used by the female insect to lure a mate of the same species. The pheromones used for insect control are synthetically produced copies of these chemicals released by the insects. Aerially applied dispensers in the form of tiny plastic flakes serve as point sources of the synthetic pheromones. the pheromones are then released at a controlled rate from the flakes to attract and confuse the adult male insects preventing them from locating and mating with eligible females. Unwanted insect populations can be safely and effectively reduced through this technique of mating disruption.

The use of aerial dispensers for particulate material is old and well known in the art as evidenced by the Pelton U.S. Pat. No. 1,749,504, the Smith et al U.S. Pat. No. 3,204,896 and the Barlow U.S. Pat. No. 3,495,793. In each of these patents, the particulate material is gravity fed through a bottom opening in a hopper and transported to a dispensing chamber by means of a rotary auger. It is also known in the art to assist the distribution of the material being dispensed by means of a rotary impeller disposed adjacent the outlet of the aerial dispenser. The rotary impeller can be driven by means of a motor as in the abovementioned Smith et al patent or may be driven by a propeller which is rotated by the passage of air as in the Robertson U.S. Pat. No. 2,056,296.

In the mixing art, the use of helical ribbon-type mixing blades in an elongated cylindrical mixing chamber is also old and well known as evidenced by the Attwell U.S. Pat. No. 4,205,919. While Attwell also discloses the addition of a liquid through a radial port for mixing with particulate matter, the mixing results in a viscous mass such as wet concrete which is forced outwardly through a radial passage, the opposite ends of the mixing chamber being closed.

SUMMARY OF THE INVENTION

The present invention provides a new and improved aerial spraying apparatus which provides for the adhesive coating of flakes immediately prior to the dispensing of the flakes from the airborne applicator to prevent agglomeration of flakes. The adhesive coated flakes which are very tiny pieces cut from larger laminated plastic sheets will then be distributed over the desired acreage with the adhesive coating allowing a sizeable fraction of the flakes to cling to foliage above the ground, the region in which insect mating most often occurs and in which the pheromone product will, therefore, be the most beneficial.

The present invention provides a new and improved aerial dispensing system for installation on an aircraft and includes two self-contained, removable applicator units, one mounted beneath each wing, plus electrical wiring and switches within the aircraft. An applicator unit is comprised of four major components including a storage compartment for an adhesive, a hopper for storage of tiny plastic laminated flakes, a flake metering and mixing assembly and a steel tube structure for supporting these components beneath each wing. Attachment of the applicator unit to the aircraft is accomplished by bolting the steel tube structure to a pair of aluminum tees running chordwise beneath the wing. The tees are permanently mounted to the underside of the wing and tie in structurally with the front and rear wing spars. The flake hopper is movably supported by the steel tube structure to enable the hopper to be pulled aft beyond the travelling edge of the wing for loading the flakes into the hopper.

The present invention provides a new and improved aerial dispensing system including means for metering the flakes from the hopper and transporting the flakes toward the trailing edge of the wing at a predetermined rate by an auger which is driven by a variable speed electric motor. The flakes fall from the auger into a propeller driven mixer in which they are coated with adhesive, propelled outwardly through the open rear end of the mixer and then dispersed by means of a rotating spinner located at the exit of the mixer. A pump driven by an electric motor transfers the adhesive from the forward mounted storage compartment to the mixer. The storage compartment is aerodynamically styled and hinged downwardly to allow loading of the adhesive containers. Electric power for the flake auger motor and glue pump motor is suppled through the wiring and switches permanently installed in the aircraft. The pilot is in full control of the in-flight operation of the system through the use of cockpit mounted control switches.

The foregoing and other objects, features and advantages of the invention will be apparent from the following more particular description of a preferred embodiment of the invention as illustrated in the accompanying drawings.

BRIEF DESCRIPTION OF THE DRAWINGS

FIG. 1 is a side elevation view, partly in section, showing an aerial dispensing system according to the present invention mounted beneath the wing of an aircraft.

FIG. 2 is a side elevation view similar to FIG. 1 showing the hopper and associated equipment in the extended loading position beyond the trailing edge of the wing.

FIG. 3 is a top plan view of the aerial dispensing unit including the means for mounting the unit to the wing structure.

FIG. 4 is a partial fron view of the tubular support structure for the dispensing unit as viewed from the left in FIG. 1.

FIG. 5 is a side elevation view, partly in section, showing the hopper, flake auger, propeller driven mixer and dispensing spinner.

FIG. 6 is a sectional view taken along the line VI-VI in FIG. 5.

FIG. 7 is a sectional view taken along the line VII—VII in FIG. 5.

DETAILED DESCRIPTION OF THE INVENTION

A single aerial dispensing unit 10 is shown in FIG. 1 secured to the undersurface of an aircraft wing. For the purpose of balancing the aircraft load, an identical dispenser unit would be mounted under the opposite wing at an equal distance from the fuselage. The dispensing unit is comprised of several major components, namely, a support structure 12, a flake storage and dispensing apparatus 14 and an adhesive storage and pumping means 16.

The support structure 12 is comprised of a pair of parallel, elongated support tees 18 secured to the undersurface of the wing 20 and more specifically secured directly to the spars 22 and 24 by means of rivets, bolts or welds (not shown) which extend through the skin of the wing. While the structure of a wing may vary from aircraft to aircraft, most wings are provided with two substantially parallel spars extending lengthwise of the wing to which the two parallel tees can be attached. The wing 20 is also provided with movable flaps 26 along at least a portion of the trailing edge of the wing.

A substantially rectangular hollow tubular support frame 28 is comprised of a first pair of tubes 32 which extend parallel to the wing spars and a second pair of hollow tubes 36 which extend parallel to the support tees 18. Four upstanding support flanges 30 are secured to the cross-tubes 32 and are detachably connected to the support tees 18 by means of nut and bolt assemblies 34. In this manner, the entire aerial dispensing unit which is carried by the tubular support frame 28 can be quickly and easily attached and detached from the wing of the aircraft. A pair of downwardly extending support flanges 38 are secured to each side tube 36 and are detachably connected to the adhesive unit 16 by nut and bolt assemblies 40. A third pair of hollow tubular rods 42 are telescopically and slidably mounted within the hollow tubular rods 36. A pair of long support brackets 44 are secured to opposite sides of a hopper 46 by means of welding or the like and the upper ends of the support brackets 44 are detachably connected to the hollow tubular rods 42 by means of nut and bolt assemblies 48. A pair of short support brackets 50 are secured to the opposite sides of the hopper 46 by welding or other suitable means with the upper ends of the brackets secured to the hollow tubular rods 42 by means of nut and bolt assemblies 52. The forward sliding movement of the rods 42 within the hollow tubular rods 36 is limited by engagement of the brackets 44 with the hollow tubular rods 36. In order to hold the hopper in the position shown in FIG. 1 wherein the hopper is disposed completely forwardly of the trailing edge of the wing and flaps, a locking pin 54 is extended through a transverse bore in each tubular rod 42 immediately adjacent the forward ends of the tubes 36 and secured therein by means of a cotter pin of the like 56. When it is desired to fill the hopper 46 with pheromone containing flakes it is only necessary to remove the locking pins 54 and slide the tubular rods 42 rearwardly of the aircraft beyond the trailing edge of the wings and flaps to the position shown in FIG. 2. With the hopper 46 in this location, a suitable lid or other closure means (not shown) may be opened to allow the filling of the hopper with flakes.

The apparatus for conveying the flakes from the hopper 46 to a mixing chamber coating the flakes with adhesive and dispensing the flakes is secured to the hopper 46 as best seen in FIGS. 1-3. The hopper 46 has a substantially rectilinear configuration with four downwardly and inwardly sloping walls which define a flake outlet passage 16 at the bottom thereof. An annular flange 62 is secured about the outlet opening 60 by any suitable means such as welding and a mating flange 64 is secured to two spaced apart plates 66 and 68. The flanges 62 and 64 are secured together by any suitable means such as welding, nuts and bolts, rivets or the like. A pair of downwardly and inwardly sloping walls 70 and 72 are secured between the plates 66 and 68 and extend upwardly into an aperture 74 within the flange 64 to define a downspout for the flakes. A rear support plate 76 is suspended from the hopper 46 by means of two diverging rods 78 and 80. The lower ends of the rods 78 and 80 overlap and are bolted to the rear support plate 76 while the upper ends of the rods 78 and 80 are bolted to the brackets 50 on the opposite sides of the hopper 46. A hollow tubular housing 82 extends through aligned openings in the support plates 68 and 76 into engagement with the support plate 66 at one end and an end plate 84 at the opposite end. The upper half of the end of the tubular housing 82 between the support plate 66 and 68 is cut away as best seen in FIG. 6 and the walls 70 and 72 engage the upwardly extending surfaces of the cut away tubular housing. The walls 70 and 72 may be secured to the tubular housing 82 by welding or the like. The lower half of the rear end of the tubular housing 82 is cut away between the plates 76 and 84 as best seen in FIG. 7. An auger 86 is rotatably mounted within the tubular housing by means of bearings 88 in end wall 84 and support plate 66. The auger 86 is provided with a forwardly projecting shaft portion 90 and a rearwardly projecting shaft portion 92 which are rotatably mounted in the bearings 88. An electric drive motor 94 is secured between the support plates 66 and 68 with the drive shaft 96 thereof extending parallel to the portion 90 of the auger 86. A first gear 98 is secured to the shaft portion 90 and a second gear 100 in meshing engagement with the gear 98 is secured on the motor drive shaft 96.

A bearing support sleeve 102 is mounted in aligned apertures in plates 66 and 68 parallel to the tube 82. A drive shaft 104 is rotatably supported in the sleeve 102 by means of bearings 106. A hub 108 is secured to the forward end of the shaft 104 and is provided with four radially extending equally spaced rods 110, each of which has a contoured propeller blade 112 secured thereto. The opposite end of the shaft 104 is connected to one end of a flexible coupling 114.

A hollow tubular shaft 116 is connected to the opposite end of the flexible coupling 114 and is rotatably supported at one end of a hollow tubular bearing sleeve 118 by means of bearing 120. The bearing sleeve 118 is secured within a hollow tubular housing 124 which is supported in a pair of aligned apertures in the support plates 76 and 122. The tubular housing 124 extends substantially rearwardly of the support plate 76 and telescopically receives one end of a mixer housing 128. The mixer housing 128 is provided with a forward end wall 130 which abuts sleeve 118 within housing 124. A mixer shaft 132 is telescopically received within the hollow tubular shaft 116 and extends rearwardly through an aperture in the end wall 130 of the housing. The shaft 132 extends outwardly beyond he opposite end of the mixer housing 128 and has an impeller or spinner 134 secured thereto. The spinner 134 is provided with a plurality of flat radially extending blades 136. The forward end of the mixer shaft 132 is secured for rotation with the hollow tubular shaft 116 by means of a pin 138 extending through both shafts. The mixer shaft 132 is rotatably supported within the bearing sleeve 118 by means of a second bearing 126. A helical ribbon-type mixing blade 140 is secured to the mixing shaft 132 by means of a plurality of radially extending support pins 142. The blade 140 is located in a mixing chamber 129 within the housing 128. The housing 124 and the mixer housing 128 are provided with a pair of upwardly opening aligned apertures 144 and 146, respectively. The tubular housing 124 is provided with a further downwardly opening aperture 148 and a pair of parallel downwardly projecting flanges 150 are secured to the rear portion of the housing 124. A single downwardly depending flange 152 on the bottom of the mixer housing 128 is adapted to extend between the flanges 150 when the mixer is in operative position. A pin 154 extends through aligned apertures in the flanges 150 and 152 and is secured therein by means of a cotter pin 156 or the like. A pair of side walls 158 and 160 are secured to opposite sides of the rearmost end of the tube 82 and to opposite sides of the housing 124 adjacent the opening 144. The side walls 158 and 160 define a passage extending between the end of the auger tube 82 and the opening 146 in the end of the mixer housing 128. An additional protective shroud 162 is secured between the support plates 76 and 84 and extends downwardly on opposite sides of the mixing housing.

The adhesive supply assembly 16 is mounted forwardly of the hopper and mixer assembly and is comprised of a sutstantially rectilinear housing 170 which is secured to the flanges 38 on the tubular frame by means of nut and bolt assemblies 40. An aerodynamically styled closure member 174 is pivoted to the lower forward edge of the housing 170 by means of a piano-type hinge 176 so that the cover member can move from the closed position shown in solid lines in FIG. 1 to the open dotted line position. A suitable latch 176 is provided for securing the cover member in the closed position and a flexible retainer 178 is secured to the tubular frame and the upper edge of the cover to limit the downwardly opening movement of the cover as best seen in FIG. 1. The interior of the housing 170 is designed to receive one or more adhesive containers 180. These containers are generally placed in an upright position within the specially designed member 174 when the member 174 is in the lowered or loading position. A flexible supply line is connected to each container and the member 174 is raised and locked in the closed position. This places the adhesive containers in an inverted position with the neck 182 of each container protruding outwardly through an opening in the bottom of the housing 170. Suitable shut-off means (not shown) may be associated with the neck of each container. A pump assembly 184 is mounted on the rear wall of the housing 170 and an electric motor 186 is mounted on the pump assembly for driving the pump. A flexible conduit 188 is provided for transporting the liquid adhesive from the neck 182 of each container 180 to the pump assembly 184. One or more additional flexible conduits 190 are connected to the outlet of the pump assembly 184 and to a pair of diametrically opposed fittings 192 located on opposite sides of the mixing chamber 129.

In order to carry out a complete spraying operation, it is first necessary to load the adhesive bottles or containers 180 into the housing 170 and latch the cover member 174 in the closed position as shown in FIG. 1. The individual adhesive containers 180 are then connected to the pump assembly by means of supply conduits 188. The flexible conduits 190 for the delivery of the liquid adhesive to the mixing chamber 129 are connected at opposite ends to the pump assembly 184 and the nipples 192 on opposite sides of the mixer housing 128.

In order to fill the hopper 46 with a supply of laminated pheromone containing flakes, the pins 190 are removed from the forward ends of the tubular rods 42 thereby allowing the rods 42 to be shifted rearwardly within the hollow tubular rods 36 until the hopper clears the trailing edge of the wing 20 as best seen in FIG. 2. Once the hopper 46 is filled with flakes, the hopper is shifted forwardly and the pins 190 are inserted through the apertures in the rods 42 to secure the hopper in position beneath the wing as shown in FIG. 1.

Once the plane is airborne and over the contaminated acreage upon which the flakes are to be dispensed, the electric motors 94 and 186 are energized. The energization of the motor 94 will rotate the auger 86 to feed a metered supply of flakes from the bottom of the hopper into the mixing chamber 128. Simultaneously, the energization of the motor 186 will pump a metered supply of adhesive through the conduits 190 into the mixing chamber 128 through the diametrically opposed nipples 192. The pump 184 is a low pressure pump for delivering approximately 15 ounces of liquid adhesive per minute to the mixing chamber 129. The helical mixing blade 140 is constantly rotating within the mixing chamber since it is driven directly by means of the propeller blades 112 which rotate as a result of the movement of the airplane. The shaft 132 which drives the mixing blade 140 is operable over a range of 600–3600 rpm depending upon the air speed of the plane with the ideal distribution speed being approximately 900 rpm. The rotation of the blade 140 agitates the flakes to keep them airborne while impelling the flakes rearwardly out of the mixing chamber. Movement of the air past the open ended mixing chamber tends to create a negative pressure within in the mixing chamber thereby aiding in the aspiration of glue and flakes toward the outlet of the chamber. The agitation of the liquid adhesive and flakes will result in the coating of the individual flakes with adhesive. As the adhesive coated flakes exit from the mixing chamber they come into contact with the rotating spinner which is also driven by the propeller blades 112 thereby disbursing the flakes over a wider pattern.

After a spraying round has been completed, the mixing chamber 129 and the shaft carrying the mixing blade 140 can readily be removed to allow cleaning of the mixing assembly. The pin 138 is removed from the hollow shaft 116 and the mixing shaft 132 thereby allowing the shaft 132 to be axially withdrawn from the bearing assembly 120, 126. Removal of the pin 154 then allows the entire mixing chamber 128 to be withdrawn from the tubular housing 124. Once the mixing chamber, the mixing blade and the impeller have been cleaned and reassembled, the hopper refilled and the supply of glue replenished, the apparatus will be ready for a subsequent spraying operation. Once the spraying is completely finished, the spraying units can be completely removed from the aircraft by merely disconnecting the flanges 30 from the tees 18 which are permanently secured to the undersurface of the wing.

While the mixing blade has been shown and described as being driven by a propeller it is contemplated that the mixer blade could be driven by a variable speed electric motor in order to obtain a more accurate control over the speed of rotation of the mixer blade.

While the invention has been particularly shown and described with reference to a preferred embodiment thereof, it will be understood by those in the art that various changes in form and details may be made therein without departing from the spirit and scope of the invention.

What is claimed is:

1. An aerial dispensing apparatus for adhesively coating and dispensing flakes containing an insect control substance comprising support means adapted to detachably connect said apparatus to the underside of an airplane wing, flake storage means carried by said support means, liquid adhesive storage means carried by said support means, independent mixing chamber means carried by said flake storage means and spaced therefrom flake feed means and liquid adhesive feed means for supplying flakes and liquid adhesive from said flake storage means and said liquid adhesive storage means to said mixing chamber means wherein said mixing chamber means is comprised of a hollow cylindrical housing disposed below and connected to said flake feed means substantially perpendicular to the trailing edge of the wing when said apparatus is mounted on a wing of the airplane, said hollow cylindrical housing having a closed forward end and an open rear end, an aperture in the upper surface of said housing adjacent to the closed forward end for receiving flakes from said flake feed means, liquid adhesive inlet means disposed rearwardly of said aperture, shaft means concentrically disposed in said cylindrical housing with the opposite ends thereof extending forwardly and rearwardly of said cylindrical housing, air flow responsive propeller means secured to the forward end of said shaft means, mixing blade means secured to said shaft means within said cylindrical housing for maintaining said flakes airborne during application of an adhesive to said flakes through said adhesive inlet means and for ejecting said flakes from said housing directly into the atmosphere and spinner means secured to the rear end of said shaft means adjacent to and spaced from the open end of said cylindrical housing for contacting the ejected coated flakes to assist in scattering said adhesive coated flakes.

2. An apparatus as set forth in claim 1 wherein said mixing blade means is comprised of two oppositely wound helical ribbon blades extending the entire length of said cylindrical housing and carried by said shaft means in spaced relation to said shaft means and said housing.

3. An apparatus as set forth in claim 1 wherein said liquid adhesive inlet means is comprised of two diametrically opposed apertures in the sides of said cylindrical housing adjacent the middle portion thereof and further comprising pump means for injecting a liquid adhesive under pressure through said opposed apertures to coat said airborne flakes in said cylindrical housing with an adhesive.

4. An apparatus as set forth in claim 1 further comprising means for detachably connecting said mixing chamber means to said flake feed means and wherein said shaft means is comprised of a forward part and a rear part detachably connected to each other with said forward part rotably supported by said flake feed means and said rear part rotatably detachably supported by said flake feed means whereby said mixing chamber means and said rear portion of said shaft carrying said mixing blade means and said spinner means may be separated for cleaning purposes.

5. An apparatus as set forth in claim 1 further comprising an aerodynamically styled housing having a rounded nose portion secured to said support means, said liquid adhesive. storage means being located in said housing and wherein said flake storage means and said mixing chamber means are secured to said support means rearwardly of said adhesive storage means.

* * * * *